United States Patent
Spanke et al.

(10) Patent No.: US 7,826,309 B2
(45) Date of Patent: Nov. 2, 2010

(54) FILLING LEVEL MEASUREMENT DEVICE AND FILLING LEVEL MEASUREMENT AND MONITORING METHOD

(75) Inventors: Dietmar Spanke, Steinen (DE); Edgar Schmitt, Friesenheim (DE); Reinhard Schaefer, Freiburg (DE); Holger Steltner, Esslingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 573 days.

(21) Appl. No.: 10/583,385

(22) PCT Filed: Dec. 14, 2004

(86) PCT No.: PCT/EP2004/053463

§ 371 (c)(1),
(2), (4) Date: Nov. 29, 2007

(87) PCT Pub. No.: WO2005/062000

PCT Pub. Date: Jul. 7, 2005

(65) Prior Publication Data

US 2008/0302439 A1 Dec. 11, 2008

(30) Foreign Application Priority Data

Dec. 19, 2003 (DE) ................. 103 60 711

(51) Int. Cl.
*G01S 15/88* (2006.01)
*G01F 23/28* (2006.01)

(52) U.S. Cl. ............... 367/99; 367/908; 73/290 V
(58) Field of Classification Search ........... 367/99, 367/127, 908; 342/124; 73/290 V, 290 R
See application file for complete search history.

(56) References Cited

U.S. PATENT DOCUMENTS

| 4,114,441 A | * | 9/1978 | Magri ............ 73/290 V |
| 4,572,253 A | * | 2/1986 | Farmer et al. ...... 367/908 |
| 4,596,144 A | | 6/1986 | Panton et al. |
| 6,828,930 B2 | * | 12/2004 | Hagg ............ 342/124 |
| 2002/0112774 A1 | | 8/2002 | Gaiser |

FOREIGN PATENT DOCUMENTS

| DE | 42 34 300 A1 | 4/1994 |
| DE | 195 10 484 A1 | 10/1996 |
| DE | 196 36 442 A1 | 3/1998 |
| DE | 198 45 116 C1 | 12/1999 |
| DE | 100 51 025 A1 | 4/2002 |
| EP | 0 668 488 A2 | 8/1995 |
| EP | 1 020 735 A2 | 7/2000 |
| WO | WO 01/18502 A1 | 3/2002 |
| WO | WO 02/27349 A2 | 4/2002 |
| WO | WO 03/034004 A1 | 4/2003 |

* cited by examiner

*Primary Examiner*—Ian J Lobo
(74) *Attorney, Agent, or Firm*—Bacon & Thomas, PLLC

(57) ABSTRACT

A method for measuring a fill level of a fill substance in a container and for monitoring at least one predetermined fill level ($L_{MIN}$, $L_{MAX}$), using a fill level measuring device working according to the travel-time principle, as well as a corresponding fill level measuring device, wherein the monitoring satisfies high safety standards, wherein, in each measuring cycle, transmission signals (S) are sent toward the fill substance and their echo signals (E) are received, the fill level is determined, based on the echo signals (E), in a first evaluation method, and it is determined, based on the echo signals (E), in a second evaluation method independent of the first evaluation method, whether the fill level exceeds or falls beneath the predetermined fill levels ($L_{MIN}$, $L_{MAX}$).

7 Claims, 3 Drawing Sheets

FILLING LEVEL MEASUREMENT DEVICE AND FILLING LEVEL MEASUREMENT AND MONITORING METHOD

TECHNICAL FIELD

The invention relates to a fill level measuring device working according to the travel-time principle and to a method for measuring a fill level of a fill substance in a container and for monitoring at least one fixedly predetermined fill level with the fill level measuring device.

BACKGROUND DISCUSSION

In the case of fill level measurement according to the travel-time principle, signals, for instance, microwave signals or ultrasonic signals, are periodically sent toward the surface of a fill substance by means of a sending and receiving element and their echo signals reflected on the surface are then received following a distance dependent travel-time. An echo function representing echo amplitudes as a function of travel-time is formed. Each value of this echo function corresponds to the amplitude of an echo reflected at a certain distance from the sending and receiving element.

From the echo function, a wanted echo is ascertained which probably corresponds to the reflection of the transmission signal on the fill substance surface. In such case, it is, as a rule, assumed that the wanted echo has the greatest amplitude, as compared with the remaining echoes. From the travel-time of the wanted echo, in the case of known propagation velocity of the transmission signals, the distance between the fill substance surface and the sending and receiving element, and, consequently, the fill level, is directly determined.

For determining the fill level, all known methods can be used which make possible the measurement of relatively short distances, e.g. under one hundred meters, by means of reflections of the transmission signals.

A known method is the frequency modulated continuous wave method (FMCW method) used in connection with fill level measuring devices working with microwaves. In FMCW methods, a microwave signal is continuously transmitted which is periodically frequency modulated, for example, on the basis of a sawtooth function. The frequency of the received echo signals exhibits, therefore, compared with the instantaneous frequency possessed by the transmission signal, at the point in time of its receipt, a frequency difference which depends on the travel-time of the echo signal. The frequency difference between the transmission signal and the received signal, which can be determined by a mixing of both signals and evaluating the Fourier spectrum of the mixed signal, corresponds then to the distance of the reflecting surface from the antenna. Additionally, the amplitudes of the spectral lines of the frequency spectrum obtained by Fourier transformation corresponds to the echo amplitudes. This Fourier spectrum thus represents in this case the echo function.

Another known method is the pulse travel-time method which is used both in the case of fill level measuring devices working with microwaves and with fill level measuring devices working with ultrasonic waves. In the case of pulse travel-time methods, short, transmission signals, so called transmitted pulses, are periodically sent, which are reflected by the fill substance surface, and their echo signals are later received, following a distance-dependent travel-time. The received signal amplitudes as a function of time provides the echo function. Each value of this echo function corresponds to the amplitude of an echo reflected at a certain distance from the sending and receiving element.

In the technology of fill level measurement, in such case, frequently a considerable effort is expended toward being able to execute reliable measurements even under difficult measuring conditions, e.g. in the case of fixedly installed disturbances in the container, stirrers sporadically protruding into the signal path or poor signal quality.

To this end, in part, very complex signal registering, signal conditioning, and/or signal evaluation methods are applied.

In a large number of applications, it is necessary additionally, for fill level measurements to monitor an exceeding or a falling beneath of one or more fixedly predetermined fill levels. Such a fixedly predetermined fill level is, for example, a fill level upper limit which must not be exceeded, in order to prevent an overfilling of the container. A further example is a fill level lower limit which must not be fallen beneath, e.g. in order to exclude the possibility of running pumps in a dry state.

The monitoring of predetermined fill levels thus serves for operational safety and is even, in some cases, required by law. For instance, the Water Management Law applicable in Germany contains such specifications.

Due to the safety relevance of the monitoring of predetermined fill levels, it is imperative that the monitoring run durably without error. Coupled therewith, the monitoring must satisfy high safety standards. Preferably, the functioning of the monitoring can be initially checked with reference to all measuring situations possibly arriving during operation.

In many applications, therefore, in addition to continuously operating fill level measuring devices, fill level limit switches are installed which monitor the exceeding, or falling beneath, of predetermined fill levels.

Signal registering, signal conditioning, and/or signal evaluation methods of conventional commercial fill level limit switches are, as a rule, markedly simpler in construction than fill level measuring devices. Correspondingly, it is easier to test for their error-free functioning, and they can be checked in advance for their ability to handle all measuring situations possibly arising during operation.

It represents, however, a considerable cost, space and maintenance requirement, to install these devices in addition to the fill level measuring devices.

It is possible to monitor exceeding or falling beneath the fixedly predetermined fill levels on the basis of fill levels measured with the continuously working fill level measuring device. However, since in the case of the described conventional fill level measuring devices, as a rule, complex signal registering, signal conditioning and/or signal evaluation methods are used, it is frequently not possible to test in advance the limit level monitoring performable with it, with reference to all the possibly arising measuring situations, for the purpose of eliminating possible erroneous measurements with certainty.

SUMMARY OF THE INVENTION

It is an object of the invention to enable fill level measurements and monitoring of at least one fixedly predetermined fill level using a fill level measuring device working according to the travel-time principle, wherein the monitoring satisfies high safety standards.

To this end, the invention resides in a method for measuring a fill level of a fill substance in a container and for monitoring at least one predetermined fill level in a container using a fill level measuring device working according to the travel-time principle, wherein, in each cycle of measurement, transmission signals are sent toward the fill substance and their echo signals are received, based on the echo signals, the fill level is determined in a first evaluation method, and based on the echo signals, it is determined in a second evaluation method independent of the first evaluation method whether the fill level exceeds or falls below the predetermined fill levels.

Additionally, the invention resides in a method using a fill level measuring device working according to the travel-time principle for measuring a fill level of a fill substance in a container and for monitoring at least one predetermined fill level in a container, wherein, in a fill level measuring cycle, transmission signals are sent toward the fill substance and their echo signals are received, based on the echo signals registered in the fill level measuring cycle, the fill level is determined in a first evaluation method, and, in a limit level measuring cycle, transmission signals are sent toward the fill substance and their echo signals are received, based on the echo signals registered in the limit level measuring cycle, in a second evaluation method independent of the first evaluation method, it is determined whether the fill level exceeds or falls beneath the specified fill levels.

In an embodiment of the above method, the fill level measuring device includes a first signal processing branch in which echo signals used for determining fill level are conditioned.

In a second embodiment, the fill level measuring device includes a second signal processing branch in which echo signals used for determining the exceeding or falling beneath of the fixedly predetermined fill levels are conditioned.

In a further development of the above method, for determining the exceeding or falling beneath of the predetermined fill levels, there is derived from the echo signal an echo function, which represents an amplitude of the echo signal as a function of a travel time. A measure for the area under the echo function in the region of a particular travel time to be expected for the predetermined fill level is determined and it is ascertained, that the fill level exceeds the particular predetermined fill level, when the measure exceeds a predetermined reference measure, while it is ascertained that the fill level falls beneath the particular predetermined fill level, when the measure falls beneath a predetermined reference measure.

In a first embodiment, the measure corresponds to an integral over the echo function in the region of the particular travel-time to be expected for the predetermined fill level.

In another embodiment, the measure corresponds to an average value, median or maximum of the amplitudes of the echo function in the region of the particular travel-time to be expected for the predetermined fill level.

In a further development of the method, for determining or detecting the exceeding or falling beneath of the predetermined fill levels, an echo function is derived from the echo signal. The echo function represents an amplitude of the echo signal as a function of a travel-time. A first measure for the area under the echo function in the region of a particular travel-time to be expected for the predetermined fill level is determined. In like manner, a comparison measure is determined for a predetermined reference region of the echo function, and it is determined based on a comparison of the particular first measure with the comparison measure, whether the fill level exceeds or falls beneath the particular predetermined fill level.

In a further development, a plausibility check of results of the first evaluation method is conducted based on results of the second evaluation method.

In a further development of the method in which the fill level measuring device is a fill level measuring device working with ultrasound, for detecting whether one of the predetermined fill levels is exceeded or fallen beneath, transmission signals of a fixedly predetermined transmission frequency are emitted.

Additionally, the invention resides in a fill level measuring device working according to the travel-time principle, including a sending and receiving element for emitting transmission signals and for receiving their echo signals;

a first evaluation module for performing a first evaluation method for determining fill level; and a second evaluation module for performing a second evaluation method for detecting an exceeding or falling beneath of at least one fixedly predetermined fill level.

In a further development of the fill level measuring device, such includes a first signal processing branch for conditioning echo signals used for determining fill level and a second signal processing branch used for conditioning echo signals referenced for detecting the exceeding or falling beneath of the fixedly predetermined fill levels.

BRIEF DESCRIPTION OF THE DRAWINGS

The invention and further advantages will now be explained in greater detail on the basis of the figures of the drawing in which three examples of embodiments are presented; equal elements are provided in the figures with equal reference characters. The figures show as follows.

DETAILED DESCRIPTION OF THE DRAWINGS

Figure 1:
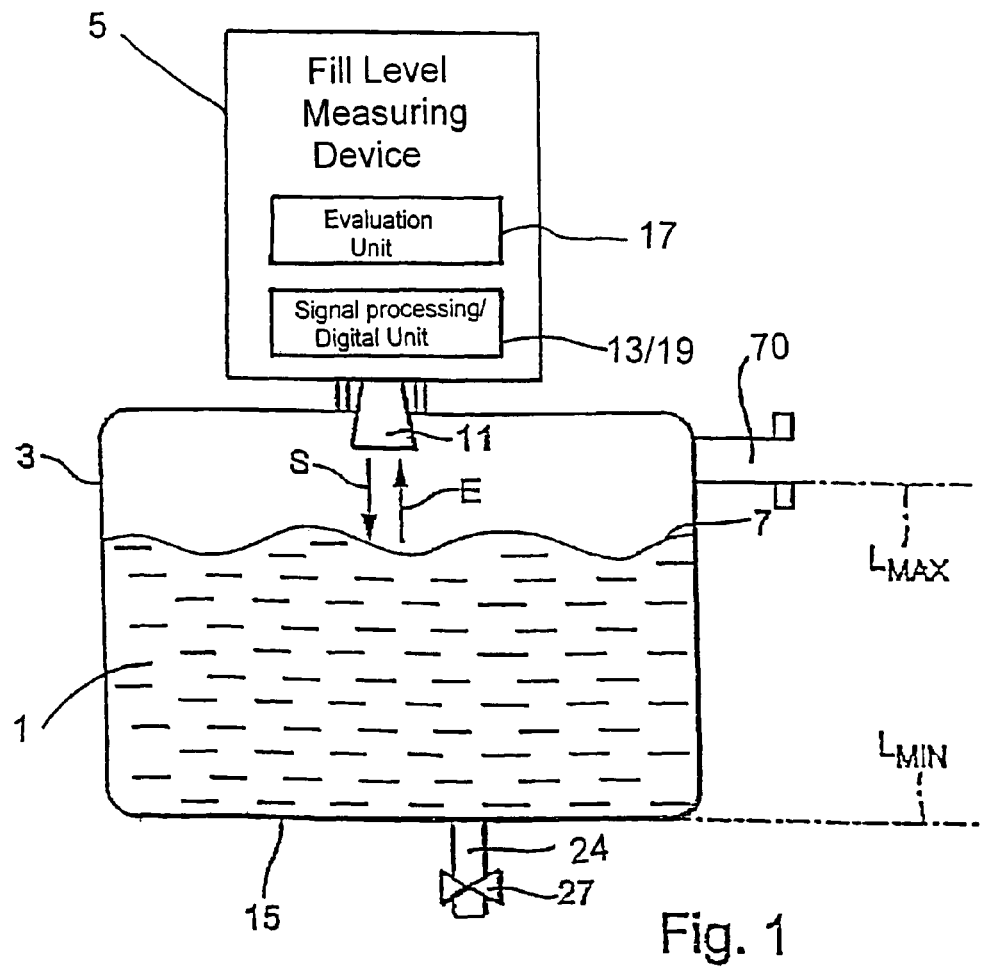
FIG. 1 an arrangement for fill level measurement.

FIG. 1 shows an arrangement for fill level measurement and for monitoring an exceeding, or subceeding (falling beneath), of at least one predetermined fill level. Fill substance 1 is contained within a container 3. Arranged on the container 3 is a fill level measuring device 5 working according to the travel-time principle. Suited as the fill level measuring device 5 is, e.g. a fill level measuring device working with microwaves or a fill level measuring device working with ultrasound. Fill level measuring device 5 serves for measuring a fill level 7 of a fill substance 1 in the container and/or for monitoring the exceeding or falling beneath of at least one predetermined fill level.

The fill level measuring device 5 includes at least one sending and receiving element 11 for the emission of transmission signals S and for reception of echo signals E. In the illustrated example of an embodiment, a fill level measuring device working with microwaves is presented, which, as sending and receiving element 11, includes a single antenna 11, which both sends and also receives. Alternatively, however, there can also be provided one antenna for sending and at least one additional antenna for receiving. In the case of a fill level measuring device working with ultrasound, the sending and receiving element would be, instead of the antenna, an ultrasonic sensor including an electromechanical transducer, e.g. a piezoelectric element.

The transmission signals S are sent toward the fill substance 1 and reflected on a fill substance surface. The reflected transmission signal forms the echo signal E.

Figure 3:
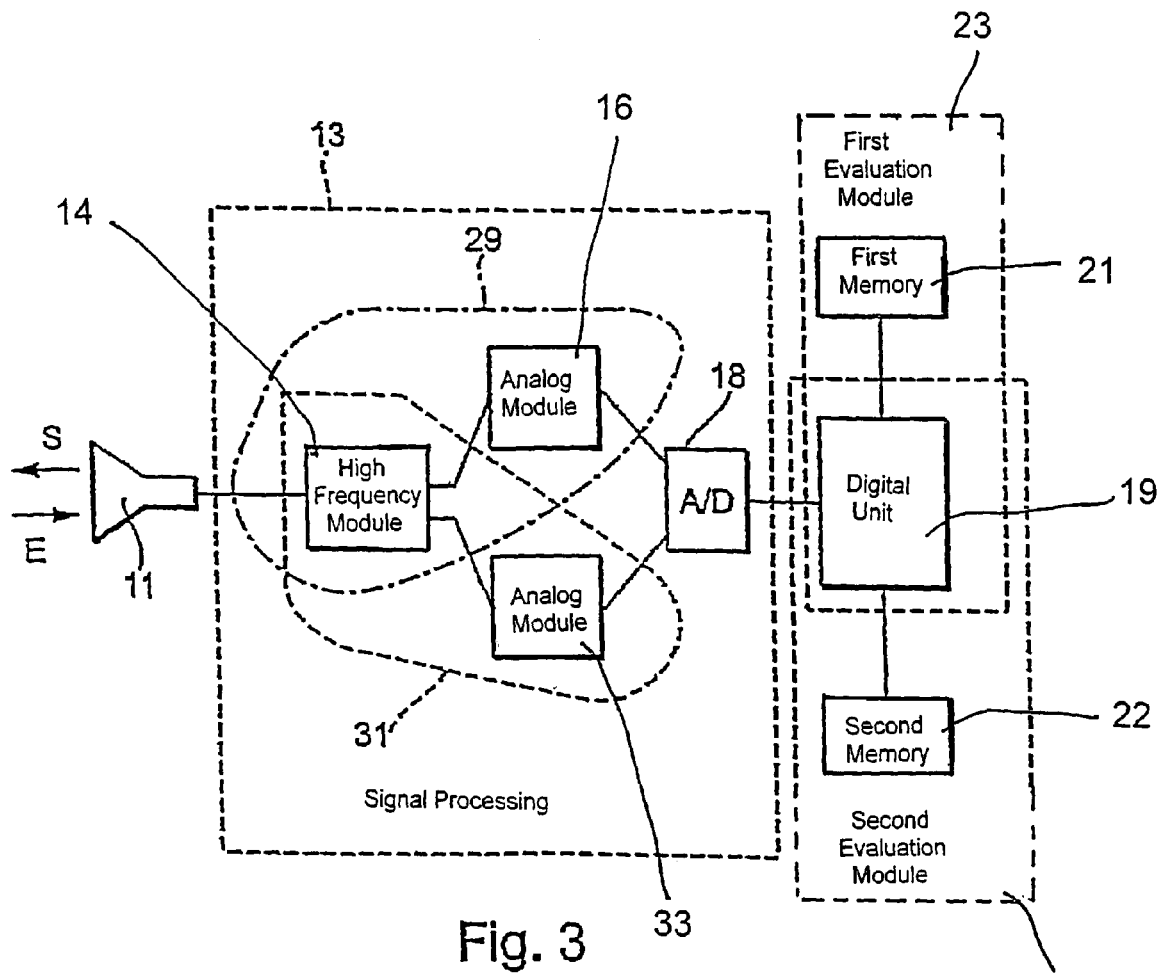
FIG. 3 a block diagram of a fill level measuring device working with microwaves.

In the case of fill level measurements according to the travel-time principle, in each measuring cycle, transmission signals S, e.g. short microwave, or ultrasonic, pulses are emitted toward a fill substance 1. Their echo signals E are registered and fed to a signal processing 13. The signal processing 13 serves for conditioning the received echo signals E. FIG. 3 shows a simplified construction of a fill level measuring device 5 working with microwaves. The signal processing 13 is connected to the transmitting and receiving element 11 and includes a high frequency module 14 and an analog module 16.

The high frequency module 14 is, for example, composed as follows. A microwave generator is provided which continuously produces microwaves of a frequency in the gigahertz range. A generator is provided oscillating with a pulse repetition frequency and connected with a control circuit. The control circuit starts the microwave generator for a very short interval of time corresponding to the desired pulse length of the microwave pulses to be transmitted and then turns the generator off. This procedure repeats with the pulse repetition frequency applied to the control circuit. This amounts to e.g. some megahertz. The microwave generator is connected via a directional coupler or circulator with the sending and receiving element 11.

Echo signals E received by the sending and receiving element 11 are fed via the directional coupler or circulator to the receiving and evaluating circuit, amplified and fed to a first input of a mixer. The generator oscillating with the pulse repetition frequency is connected, via a time delay stage and a second control circuit working identically to the first control circuit, with a second microwave generator. The second microwave generator is constructed identically to the first microwave generator. The control circuit effects that the second microwave generator produces microwave pulses turned-on with the pulse repetition frequency. These lie on a second input of the mixer. The time delay stage delays the entering signals by a variable delay time, e.g. one increasing according to a sawtooth function of finite width. In the mixer, thus, a microwave signal delayed by a variable delay time is superimposed on a microwave signal of essentially equal form, delayed by a fill-level-dependent travel time. The signal available at the output of the mixer corresponds to the correlation of the microwave signals incoming on its two inputs. It contains a high frequency part which contains frequencies given essentially by the sum of the frequencies lying on the inputs and a low frequency part which contains frequencies given essentially by the difference of the frequencies lying on the inputs. By means of a low pass, the low frequency part is filtered out and fed to the analog module 16. There the incoming signal is recorded, e.g. by means of a sample and hold circuit, and its particular signal amplitude A is recorded together with the belonging delay time t as an echo function.

The echo signals E conditioned in the signal processing 13 are fed to an evaluation unit 17. The actual evaluation occurs preferably in digital form. For this purpose, the conditioned echo signals are fed to an analog to digital converter 18 whose output signal is applied to an input of the evaluation unit 17.

By means of the evaluation unit 17, the fill level is determined based on the echo signals in a first evaluation method. For this, the evaluation unit 17 has a digital unit 19, e.g. a microcontroller or a digital signal processor, and a first memory 21 associated therewith. The first evaluation method is executed by applying to the conditioned echo signals E evaluation programs stored in the first memory 21 and running in the digital unit 19.

Usually, there is derived from the received echo signals E an echo function A(t) which contains amplitudes A of the echo signal E as a function of travel-time t.

Figure 2:
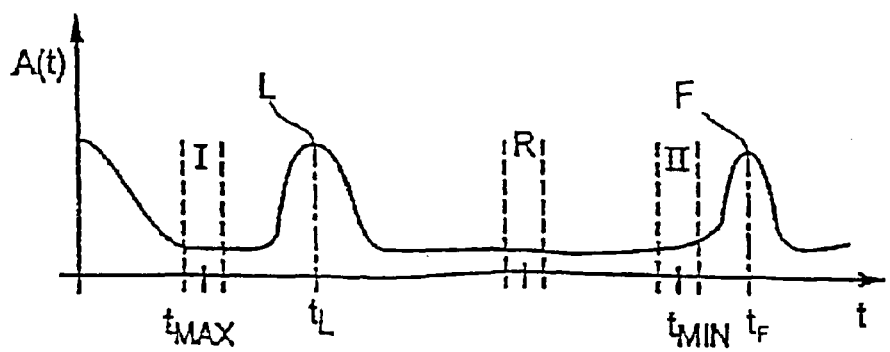
FIG. 2 a simplified representation of an echo function obtainable with the arrangement of FIG. 1.

FIG. 2 shows a greatly simplified example of such an echo function for the arrangement of FIG. 1. The echo function exhibits two marked maxima. These maxima are the echoes L and F, of which the echo L is attributable to reflection on the fill substance surface and echo F to a reflection on the floor of the container 3. The echoes L and F arise following travel-times $t_L$, $t_F$, which correspond to the distances between the sending and receiving element 11 and the fill substance surface, respectively the floor 15.

In the first evaluation method, the echo L resulting from reflection on the fill substance surface is determined. For this, in fill level measuring devices of today, there are already a large number of, in part, very complex methods applied which enable an exact analysis of the echo signals and a recognition of the echo L coming from the fill level. In this case, e.g. signal filterings are carried out, multiple echoes attributable to multiple reflections in the container are eliminated, echoes attributable to reflections on disturbances installed in the container are eliminated, and much more. At the end of the first evaluation method, as a rule, the echo L coming from the fill substance surface reflection has been recognized, from whose travel-time $t_L$ the current fill level 7 results.

In accordance with the invention, the echo signals E are additionally subjected to a second evaluation method independent of the first evaluation method. In the second evaluation method, it is determined whether the fill level 7 exceeds or falls beneath a predetermined fill level.

In FIG. 1, for example, two predetermined fill levels $L_{MAX}$ and $L_{MIN}$ are indicated. The heights of the predetermined fill levels result from the application in which the fill level measuring device 5 is being used. The upper predetermined fill level $L_{MAX}$ is an upper limit value for the fill level 7. This should not be exceeded in the illustrated application, in order that no fill substance 1 can escape from an inspection opening 70 illustrated at this height.

The lower predetermined fill level is a lower limit value for the fill level 7. In the case of the illustrated application, this should not be fallen beneath, in order that a pump 27 installed in the outlet 24 of the container 3 does not run dry.

For monitoring the predetermined fill levels $L_{MIN}$ and $L_{MAX}$, the evaluation unit 17 additionally includes a second memory 22 associated with the digital unit 19. The second evaluation method is executed by applying in the digital unit 19, to the echo signals E, evaluation programs stored in the second memory 22.

Figures 4, 5:
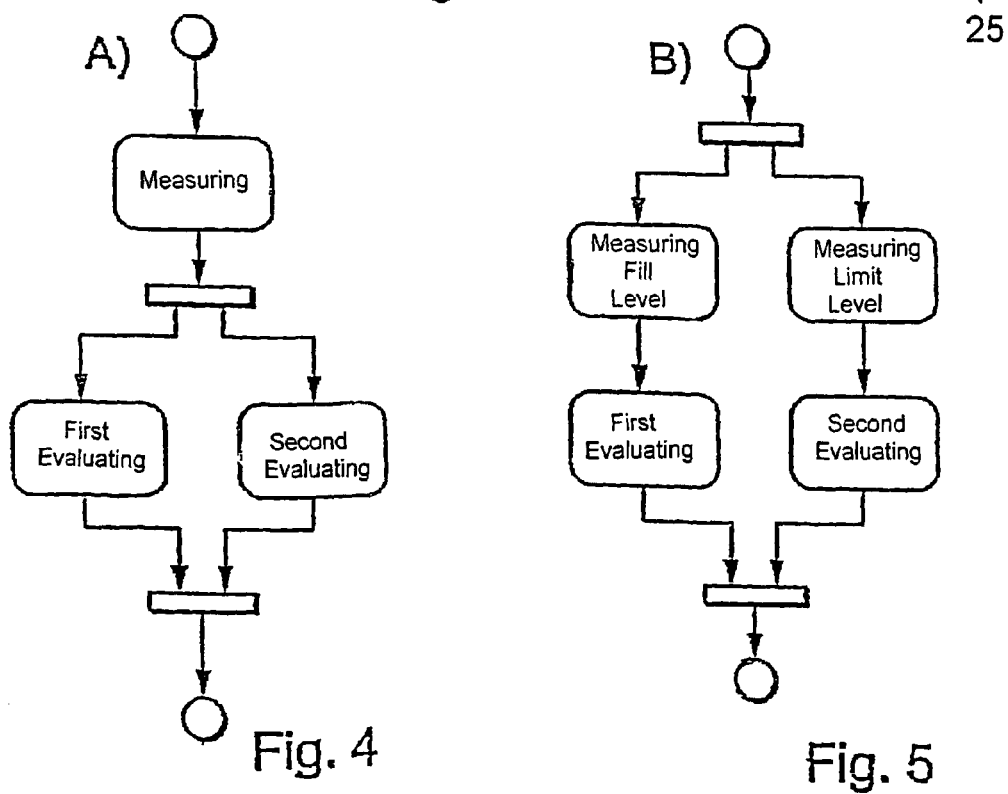
FIG. 4 a flow diagram of a measuring cycle with one measurement.
FIG. 5 a flow diagram of a measuring cycle with two measurements.

The fill level measurement and the monitoring of the predetermined fill levels $L_{MIN}$ and $L_{MAX}$ occurs alternatingly according to process flows illustrated in the FIGS. 4 and 5.

In the case of the process flow illustrated in FIG. 4, in each measuring cycle, a measurement is executed wherein transmission signals S are sent toward the fill substance 1 and their echo signals are received and conditioned. On the basis of the echo signal E of each measuring cycle, the fill level 7 is determined with the first evaluation method and the second evaluation method is used, independently of the first evaluation method, to determine whether the fill level 7 at least exceeds, or falls beneath, at least one predetermined fill level, here $L_{MIN}$ and $L_{MAX}$.

In the process flow illustrated in FIG. 5, two measurements are carried out in parallel. In such case, in a fill level measuring cycle, transmission signals S are sent toward the fill substance 1 and their echo signals E are received and conditioned. On the basis of the echo signals E registered in the fill level measuring cycle, the fill level 7 is determined with the first evaluation method.

In parallel therewith, limit level measuring cycles are carried out in which transmission signals S are sent toward the fill substance 1 and their echo signals E are received. On the basis of the echo signals E registered in the limit level measuring cycle, it is determined in the second evaluation method, independently of the first evaluation method, whether the fill level 7 exceeds, or falls beneath, at least one predetermined fill level, here $L_{MIN}$ and $L_{MAX}$.

The evaluation of the measurements according to the first and second evaluation methods occurs separately. For this purpose, a first evaluation module 23 is provided for executing the first evaluation method for determining the fill level 7 and a second evaluation module 25 is provided for executing the second evaluation method for determining the exceeding, or falling beneath, of the fixedly predetermined fill levels, here $L_{MIN}$ and $L_{MAX}$. In the example of an embodiment illustrated in FIG. 3, the first evaluation module 23 includes the digital unit 19 and the first memory 21 associated therewith.

The second evaluation module 25 includes the digital unit 19 and a second memory 22 associated therewith. The second evaluation method is carried out by applying to the echo signals in the digital unit 19 the evaluation programs stored in the second memory 22.

The first and second evaluation methods are completely independent of one another and can be debugged and tested independently of one another in a startup process. The second evaluation method is described in greater detail below. It is in comparison to the first evaluation method very simply constructed and can, therefore, be tested initially very much more completely. This simplifies also the entire developmental process, including specification, analysis, design, implementation and testing. This allows the assuring of a high degree of measurement reliability for the limit level monitoring.

The signal processing 13 includes preferably first and second signal processing branches 29, 31. The first signal processing branch 29 serves for conditioning the echo signals E which are used for determining the fill level 7. This includes, in the example of an embodiment illustrated in FIG. 3, the high frequency module 14 and the analog module 16.

The second signal processing branch 31 serves for conditioning the echo signals E which are referenced for determining the exceeding, or falling beneath, of the fixedly predetermined fill levels $L_{MIN}$ and $L_{MAX}$. In the case of the example of an embodiment illustrated in FIG. 3, the second signal processing branch 31 includes the high frequency module 14 and an additional analog module 33. The analog module 33 is preferably very simply constructed. It can be, for example, a rectifier which rectifies the incoming signals. The output signals of the additional analog module 33 are applied to the analog-to-digital converter 18 and are then fed in digital form to the digital unit 19.

The dividing of the signal processing 13 into first and second signal processing branches 29, 31 offers the advantage that the two signal processing branches 29, 31 can be separately tested. The second signal processing branch 31 is constructed more simply in comparison to the first. Correspondingly, its reliable functioning can be tested more easily and more completely with reference to all measuring situations possibly arising. This offers the advantage that, for the monitoring of the predetermined fill levels, here $L_{MIN}$ and $L_{MAX}$, using the second signal processing branch 31, by corresponding tests, a higher measure of safety can be assured than for the fill level measurement.

Figure 6:
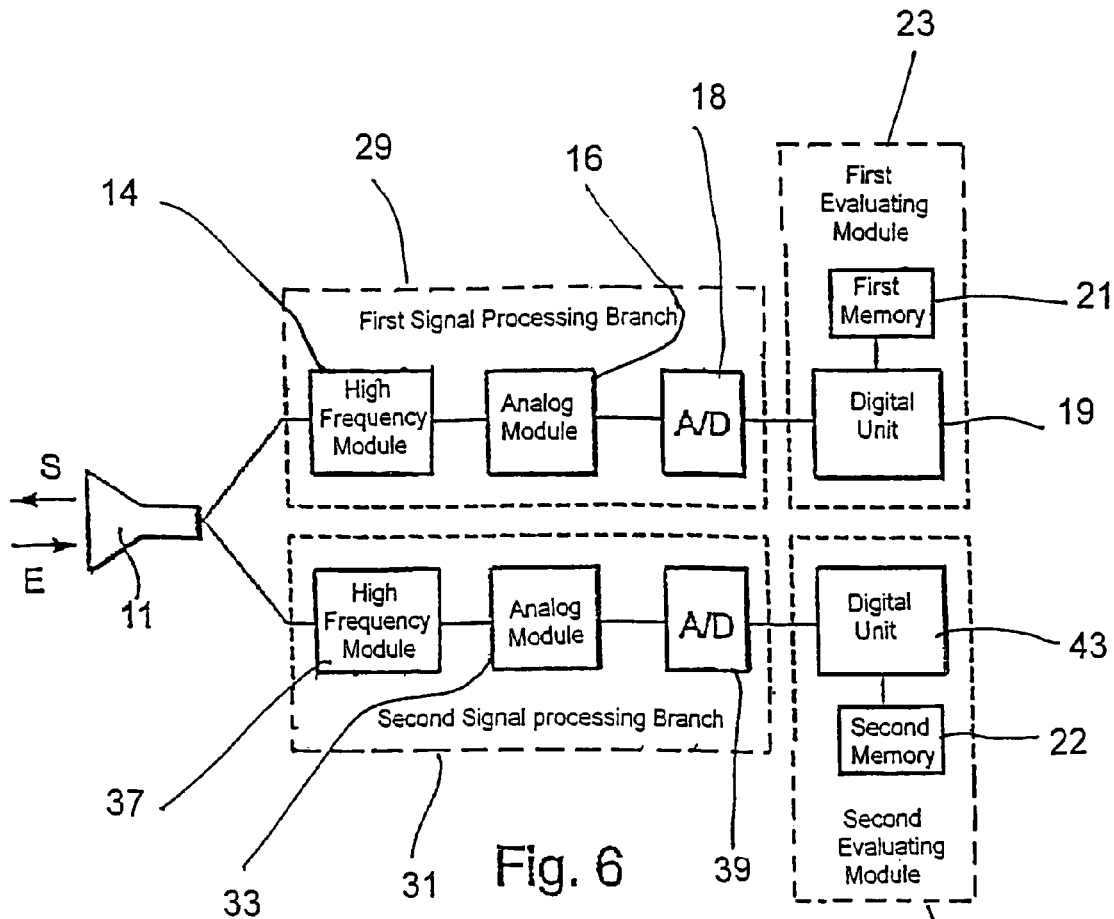
FIG. 6 a block diagram of a fill level measuring device working with microwaves and utilizing two separated, signal-conditioning branches.

FIG. 6 shows a further example of an embodiment for the construction of a fill level measuring device 5 working with microwaves. On the basis of the great similarity to the example of an embodiment illustrated in FIG. 3, here only differences are explained in greater detail.

The example of an embodiment illustrated in FIG. 6 includes two completely separated signal processing branches 29 and 31. The first signal processing branch 29 is identical to that in the first signal processing branch 29 illustrated in FIG. 3. The second signal processing branch 31 has an additional high frequency module 37 which is connected in parallel with the high frequency module 14 to the sending and receiving module 11. Additionally, the second signal processing branch 31 includes the analog module 33 connected to the additional high frequency module 37.

The example of an embodiment illustrated in FIG. 6 additionally includes two completely separated evaluation modules 23 and 41. The first evaluation module 23 corresponds to that shown in FIG. 3. The second evaluation module 41 has an additional digital unit 43 which is connected via an analog-to-digital converter 39 to the analog module 33. The additional digital unit 43 is associated with the second memory 22.

Figure 7:
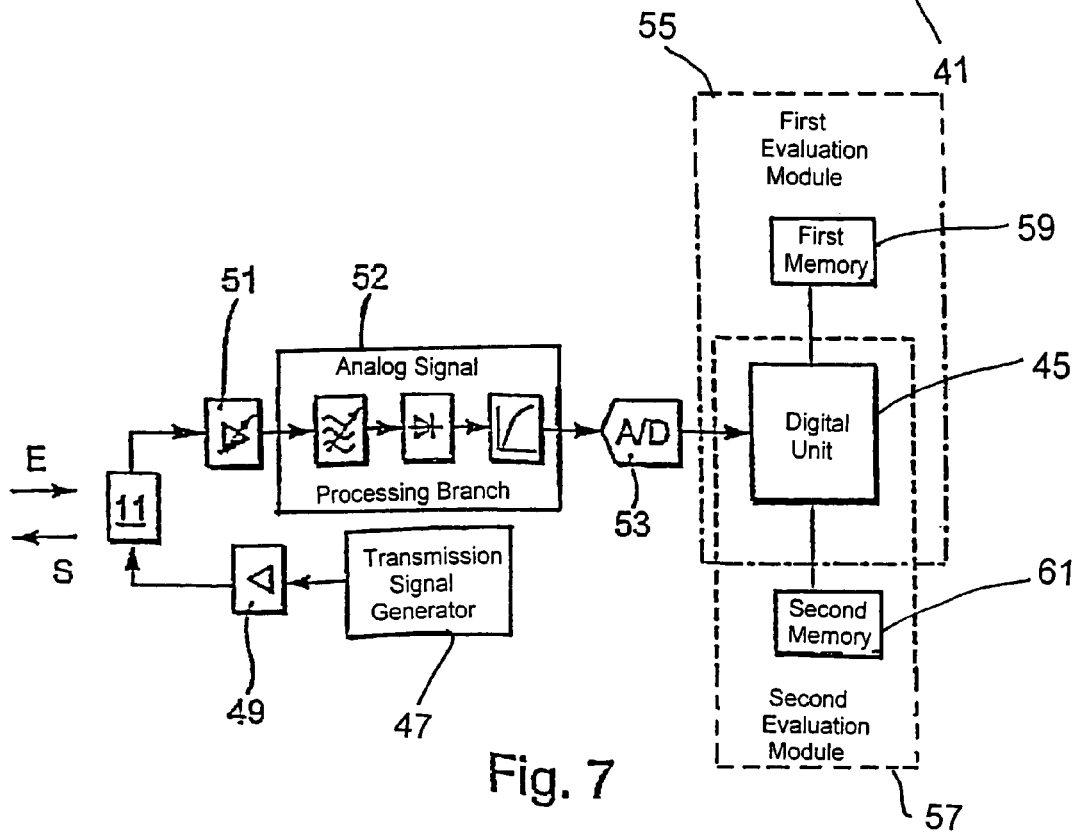
FIG. 7 a block diagram of a fill level measuring device working with ultrasound.

FIG. 7 shows an example of an embodiment of a fill level measuring device 5 of the invention working with ultrasonic sound.

Included as sending and receiving element 11 is an electromechanical transducer which is arranged in a pot-shaped housing closed by a floor. The electromechanical transducer is, for example, a piezoelectric element. It is, however, also possible to use other types of electromechanical transducers. The housing is made, e.g. of a plastic, e.g. polypropylene. The electromechanical transducer serves for emitting and receiving ultrasound through the floor.

Core component of the fill level measuring device 5 is a digital unit 45, e.g. a digital signal processor. A transmission signal generator 47 generates, for example, periodically, short ultrasonic wave pulses which are fed to a transmission amplifier 49. The amplified analog output signals are fed to the sending and receiving element 11 and emitted by this as transmission signals S into the container 3 toward the fill substance 1. Echo signals E of the transmission signals S are registered by means of the sending and receiving element 11 and fed to a receiver amplifier 51. Its output signals are fed to an analog signal processing 52 which includes, for example, as shown in FIG. 7, a band pass filter, a rectifier, and a logarithmizer. The output signals of the analog signal processing branch 52 are fed to an analog-to-digital converter 53 which in turn is connected to the digital unit 45.

Analogously to the previously described example of an embodiment with a fill level measuring device working with microwaves, also here according to the invention, the fill level 7 is determined based on the echo signals E in a first evaluation method and, in a second evaluation method independent of the first evaluation method, it is determined whether the fill level 7 has exceeded or fallen beneath at least one predetermined fill level, here $L_{MIN}$ and $L_{MAX}$. For this, the process flows explained on the bases of FIGS. 4 and 5 are available for selection.

Analogously to the example of an embodiment illustrated in FIG. 3, the fill level measuring device 5 illustrated in FIG. 7 includes a first evaluation method or module 55 for performing a first evaluation method for determining the fill level 1 and a second evaluation module 57 for performing a second evaluation method for determining exceeding or subceeding of the fixedly predetermined fill levels, here $L_{MIN}$ and $L_{MAX}$. The first evaluation module 55 includes the digital unit 45 and a first memory 59 associated therewith. The first evaluation method is executed by applying evaluation programs stored in the first memory 59 in the digital unit 45 to the echo signals E.

The second evaluation module 57 includes the digital unit 45 and a second memory 61 associated therewith. The second evaluation method is executed by applying in the digital unit 45 evaluation programs stored in the second memory 61 to the echo signals E.

In the case of fill level measuring devices working with ultrasound and the travel-time principle, preferably an optimum transmission frequency is determined which the transmission signals S exhibit for fill level measurement. The optimum transmission frequency depends on a resonance frequency of the electromechanical transducer and on temperature. Through the use of this optimum transmission frequency, an improved signal quality is achieved, and, therewith, the accuracy of the fill level measurement is improved. Determination and setting of this transmission frequency involves, however, sources of error which are undesired for the monitoring of the predetermined fill levels, $L_{MIN}$ and $L_{MAX}$, and, as a rule, are not outweighed by the advantages of improved signal quality for the limit level monitoring. In the case of fill level measuring devices 5 working with ultrasound, therefore, for determining whether one of the predetermined fill levels $L_{MIN}$ and $L_{MAX}$ has been exceeded or fallen beneath, preferably transmission signals S of fixedly predetermined transmission frequency are transmitted. This offers a higher measure of safety for the limit level monitoring.

Of course, the invention is not limited to the described fill level measuring devices. It is also possible to use other fill level measuring devices working according to the travel-time principle. Suited, thus, are, for example, also fill level measuring devices in the case of which transmission signals, e.g. short electromagnetic pulses, are led along a probe, e.g. a metal cable or rod extending into the container toward the fill substance and are reflected on the fill substance. Also here, echo signals of the transmission signals are registered, their amplitudes determined as a function of their travel-time, and the fill level determined therefrom. This form of fill level measurement is known under the label Time Domain Reflectometry.

Common to all fill level measuring devices working on the basis of the travel-time principle is that an echo function is derivable, which represents echo signal amplitude as a function of a travel time. Such an echo function is illustrated in FIG. 2 in greatly simplified form.

On the basis of this echo function, according to the invention, in a second evaluation method, it is determined whether a predetermined fill level, $L_{MIN}$, $L_{MAX}$, has been exceeded or fallen beneath.

Preferably, for this purpose, in the second evaluation method, a measure for the area under the echo function in the regions 1, II of travel-times, $t_{MIN}$, $t_{MAX}$, to be expected in each case, respectively, for the predetermined fill level, $L_{MIN}$, $L_{MAX}$, is determined. Alternatively, naturally also a measure for a reciprocal of the enclosed area can be determined.

The travel-time $t_{MIN}$, $t_{MAX}$ to be expected is determined by a distance, predetermined by the user, of the predetermined fill level $L_{MIN}$, $L_{MAX}$ from the sending and receiving element 11 and the propagation velocity of the transmission and received signals S, E in the container 3. In FIG. 2, the travel-times $t_{MIN}$, $t_{MAX}$ to be expected for the region I associated with the predetermined maximum fill level $L_{MAX}$ and for the region 11 associated with the predetermined minimum fill level $L_{MIN}$ are illustrated for the arrangement presented in FIG. 1.

According to the invention, it is determined in the second evaluation method that the fill level 7 exceeds the particular predetermined fill level $L_{MAX}$, $L_{MIN}$ when the measure exceeds a predetermined reference measure, respectively it is determined that the fill level 7 falls below the particular predetermined fill level $L_{MAX}$, $L_{MIN}$ when the measure falls beneath a predetermined reference measure. If a measure is used that depends on the reciprocal of the area under the curve, then it naturally analogously holds that one determines that the fill level 7 of the particular predetermined fill level $L_{MAX}$, $L_{MIN}$ is exceeded when the measure falls beneath a predetermined reference measure, respectively it is determined that the fill level 7 falls beneath the particular predetermined fill level $L_{MAX}$, $L_{MIN}$ when the measure exceeds a predetermined reference measure.

A suitable measure is e.g. an integral over the echo function in the region I, II, of the particular travel-time $t_{MIN}$, $t_{MAX}$ to be expected for the predetermined fill level $L_{MAX}$, $L_{MIN}$.

Likewise possible as a measure is an average value, median or maximum of the amplitudes of the echo function A(t) in the region of the travel-time $t_{MIN}$, $t_{MAX}$ to be expected for the predetermined fill level $L_{MIN}$, $L_{MAX}$.

Also suitable as a measure is any strictly monotonic function such as e.g. integral, average value, median or maximum. The current measure can, per se, be evaluated, as above described, by comparing it with a predetermined reference measure.

Alternatively, however, also for detecting the exceeding or subceeding of the predetermined fill level $L_{MIN}$, $L_{MAX}$ based on the echo function A(t), a first measure for the area under the echo function A(t) in the region I, II, of a particular travel-time $t_{MIN}$, $t_{MAX}$ to be expected for the predetermined fill level $L_{MIN}$, $L_{MAX}$ can be determined, and, in the same way, a comparison measure can be determined for a predetermined reference region R of the echo function A(t). By a comparison of the particular first measure with the comparison measure, it is then determined whether the fill level 7 exceeds or falls beneath the particular predetermined fill level $L_{MIN}$, $L_{MAX}$.

The reference region R is illustrated in FIG. 2. It is preferably so chosen that it lies outside of all regions in which marked maxima of the echo function are to be expected. These are, for example, regions in which travel-times of echoes attributable to reflections on the fill substance 1, the floor 15, or, however, also on disturbances installed in the container 1 are to be expected. These regions can be determined on the basis of the distances from the floor and the disturbances to the sending and receiving element and on the basis of the fill level measurement.

Of course, it is sufficient to monitor an exceeding of the fill level upper limits and a falling beneath of the fill level lower limits. If a fill level upper limit is exceeded or a fill level lower limit fallen beneath, then preferably an alarm is triggered and/or an error report provided.

Preferably, a plausibility check of the measurement results achieved with the fill level measuring device is done.

In such case, a plausibility check of results of the first evaluation method is carried out based on results of the second evaluation method. From the second evaluation method it is known whether the current fill level exceeds or falls beneath the predetermined fill level $L_{MIN}$, $L_{MAX}$. From this, it follows that the current fill level 7 determined with the first evaluation method must lie above each one of the predetermined fill levels $L_{MIN}$, $L_{MAX}$ which has, according to the results of the first evaluation method, been exceeded. Reciprocally, the current fill level 7 determined with the first evaluation method must lie beneath each one of the predetermined fill levels $L_{MIN}$, $L_{MAX}$ which has been fallen beneath according to the results of the first evaluation method. If this is not the case, then the result of the first evaluation method is erroneous and should be discarded or at least checked.

Of course, also a plausibility check is possible in reciprocal form, wherein the results of the second evaluation method are checked based on the results of the first evaluation method. This form, however, is less important, since the safety end reliability of the results obtained with the second evaluation method are greater than is the case for the results obtained with the first evaluation method.

The invention claimed is:

1. A method for measuring a fill level of a fill substance in a container and for monitoring at least one predetermined fill level ($L_{MIN}$, $L_{MAX}$), using a fill level measuring device working according to a travel-time principle, comprising the steps of:

sending, in each measuring cycle, transmission signals (S) toward the fill substance and receiving their echo signals (E);

deriving an echo function from the echo signals (E) which represents an amplitude of the echo signals (E) as a function of travel-time (t) for determining the exceeding or falling beneath of the predetermined fill levels ($L_{MIN}$, $L_{MAX}$); and determining a measure for the area under the echo function in a region (I, II) of particular travel-time ($t_{MIN}$, $t_{MAX}$) to be expected for the predetermined fill level ($L_{MIN}$, $L_{MAX}$)

determining the fill level, based on the echo signals (E), according to a first evaluation, and based on the echo signals (E), according to a second evaluation independent of the first evaluation; and observing whether the fill level exceeds or falls beneath the predetermined fill level ($L_{MIN}$, $L_{MAX}$) wherein:

it is detected that the fill level exceeds the particular predetermined fill level ($L_{MIN}$, $L_{MAX}$) when the measure exceeds a predetermined reference measure;

it is detected that the fill level falls beneath the particular predetermined fill level ($L_{MIN}$, $L_{MAX}$) when the measure falls beneath a predetermined reference measure, and said measure corresponds to an integral over the echo function in the region (I, II) of the particular travel-time ($t_{MIN}$, $t_{MAX}$) to be expected for the predetermined fill level ($L_{MIN}$, $L_{MAX}$).

2. The method as claimed in claim 1, wherein:
the echo signals (E) applied for determining the fill level are conditioned by a first signal processing branch of the fill level measuring device.

3. The method as claimed in claim 2, wherein:
the fill level measuring device works with ultrasound, for determining whether one of the predetermined fill levels ($L_{MIN}$, $L_{MAX}$) has been exceeded or fallen beneath, and emits transmission signals of a fixedly predetermined transmission frequency.

4. The method as claimed in claim 1, wherein:
the echo signals (E) applied for detecting the exceeding or falling beneath of the fixedly predetermined fill levels ($L_{MIN}$, $L_{MAX}$) are conditioned by a second signal processing branch of the fill level measuring device.

5. The method as claimed in claim 1, wherein:
said measure corresponds to an average value, median or maximum of the amplitudes of the echo function in the region (I, II) of the travel-time ($t_{MIN}$, $t_{MAX}$) to be expected for the predetermined fill level ($L_{MIN}$, $L_{MAX}$).

6. The method as claimed in claim 1, further comprising the steps of:

deriving an echo function from the echo signals (E), which represents an amplitude of the echo signals (E) as a function of a travel-time (t) for determining the exceeding or falling beneath of the predetermined fill levels ($L_{MIN}$, $L_{MAX}$);

determining a first measure for area under the echo function in the region (I, II) of a particular travel-time ($t_{MIN}$, $t_{MAX}$) to be expected for a particular predetermined fill level ($L_{MIN}$, $L_{MAX}$);

a comparison measure is, in the same way, determined for a predetermined reference region (R) of the echo function, and, based on a comparison of the particular first measure with the comparison measure, it is determined whether the fill level exceeds or falls beneath the particular predetermined fill level ($L_{MIN}$, $L_{MAX}$).

7. The method as claimed in claim 1, wherein:
based on results of the second evaluation, a plausibility check is carried out for results of the first evaluation method.

* * * * *